(12) United States Patent
Inagaki et al.

(10) Patent No.: US 9,223,625 B2
(45) Date of Patent: Dec. 29, 2015

(54) CLIENT SERVER SYSTEM AND METHOD FOR EXECUTING AN APPLICATION UTILIZING DISTRIBUTED OBJECTS

(75) Inventors: Iwao Inagaki, Kawasaki (JP); Seiji Hamada, Kanagawa-ken (JP); Masahiro Ohkawa, Kanagawa-ken (JP); Naomi Zenge, Kanagawa-ken (JP); Kaori Nanba, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 13/447,543

(22) Filed: Apr. 16, 2012

(65) Prior Publication Data

US 2012/0260264 A1 Oct. 11, 2012

Related U.S. Application Data

(60) Division of application No. 12/123,852, filed on May 20, 2008, now Pat. No. 8,185,578, which is a continuation of application No. 09/651,585, filed on Aug. 29, 2000, now Pat. No. 7,398,313.

(30) Foreign Application Priority Data

Sep. 14, 1999 (JP) .................................... 99-260355

(51) Int. Cl.
*G06F 15/16* (2006.01)
*G06F 9/50* (2006.01)
(Continued)

(52) U.S. Cl.
CPC .............. *G06F 9/5027* (2013.01); *G06F 9/466* (2013.01); *G06F 9/547* (2013.01); *H04L 67/28* (2013.01); *H04L 67/2833* (2013.01); *H04L 67/2838* (2013.01); *G06F 2209/5011* (2013.01);
(Continued)

(58) Field of Classification Search
CPC ....................................................... G06F 9/466
USPC ................................................... 709/225, 228
See application file for complete search history.

(56) References Cited

U.S. PATENT DOCUMENTS 6,233,623 B1  5/2001  Jeffords et al.
6,253,254 B1  6/2001  Erlenkoetter et al.
(Continued)

FOREIGN PATENT DOCUMENTS

JP  275563  11/1990
JP  218842  8/1997
(Continued)

OTHER PUBLICATIONS

"Corba Technology of Hitachi Application Server", Java World, vol. 3, No. 6, pp. 130-131.

*Primary Examiner* — Douglas Blair
(74) *Attorney, Agent, or Firm* — Steven M. Greenberg, Esq.; CRGO Law

(57) ABSTRACT

A client connected to a communication network performs an access request to an object. An application server performs an application by an actual object according to the client request. An object pool connected to the client and the application server pools a proxy object corresponding to the actual object and holds the actual object management information. The application server notifies the object pool of an event according to the status change of the application. The object pool automatically updates the actual object management information according to the notification of the event from the application server.

2 Claims, 21 Drawing Sheets

(51) Int. Cl.
  *G06F 9/46* (2006.01)
  *G06F 9/54* (2006.01)
  *H04L 29/08* (2006.01)
  *H04L 29/12* (2006.01)

(52) U.S. Cl.
  CPC . *G06F2209/5013* (2013.01); *G06F 2209/5021* (2013.01); *H04L 29/12141* (2013.01); *H04L 61/1558* (2013.01)

(56) References Cited

U.S. PATENT DOCUMENTS

| | | | |
|---|---|---|---|
| 6,341,311 | B1 | 1/2002 | Smith et al. |
| 6,363,434 | B1 | 3/2002 | Eytchison |
| 6,425,017 | B1 | 7/2002 | Dievendorff et al. |
| 6,678,743 | B1 | 1/2004 | Glass et al. |
| 6,678,745 | B1 | 1/2004 | Hodge |
| 6,684,398 | B2 | 1/2004 | Chaudhry et al. |
| 6,687,761 | B1 | 2/2004 | Collins et al. |
| 6,721,776 | B1 | 4/2004 | Erickson et al. |
| 6,757,747 | B1 | 6/2004 | Hooper |
| 6,898,791 | B1 * | 5/2005 | Chandy et al. ............ 719/314 |
| 6,954,777 | B1 | 10/2005 | Fields et al. |
| 8,095,413 | B1 * | 1/2012 | Beaven .................... 705/7.38 |

FOREIGN PATENT DOCUMENTS

| | | |
|---|---|---|
| JP | 244896 | 9/1997 |
| JP | 1011339 | 1/1998 |
| JP | 10307783 | 11/1998 |
| JP | 119986 | 4/1999 |
| JP | 067013 | 3/2000 |
| JP | 069425 | 5/2008 |

* cited by examiner

Figure 3

Event notification managing table

| Object pool ID | Host name | Event filter |
|---|---|---|
| 112233 | Host A | All |
| 445566 | Host B | Only Error |
| 778899 | Host C | Warning |
|  |  |  |
|  |  |  |

Figure 4

Project execution monitoring table

| Project ID | Project name | Event filter |
|---|---|---|
| 112233 | Project A | Start |
| 445566 | Project B | Stopping |
| 778899 | Project C | Under execution |
|  |  |  |
|  |  |  |

ACTIVE OBJECT MANAGING TABLE

| OBJECT ID | CLASS NAME | SERVER NAME | PROJECT NAME | EXECUTION STATUS |
|---|---|---|---|---|
| 112233 | CLASS A | SERVER 3 | PROJECT X | UNDER EXECUTION |
| 445566 | CLASS E | SERVER 5 | PROJECT Y | STOPPING |
| 778899 | CLASS C | SERVER 1 | PROJECT Z | UNDER EXECUTION |

FIG. 6

FREE OBJECT MANAGING TABLE

| PRIORITY | OBJECT ID | CLASS NAME | SERVER NAME | PROJECT NAME | EXECUTION STATUS |
|---|---|---|---|---|---|
| 1 | 112233 | CLASS A | SERVER 3 | PROJECT X | UNDER EXECUTION |
| 2 | 445566 | CLASS E | SERVER 5 | PROJECT Y | STOPPING |
| 3 | 778899 | CLASS C | SERVER 1 | PROJECT Z | UNDER EXECUTION |

Object pool property managing table

| Property | Value |
|---|---|
| Maximum pool number | 500 |
| Initial pool number | 100 |
|  |  |
|  |  |

Figure 9

Pool object information

| Priority | Class name | Server name | Project name |
|---|---|---|---|
| 1 | Class A | Server 3 | Project X |
| 2 | Class E | Server 5 | Project Y |
| 3 | Class C | Server 1 | Project Z |
|  |  |  |  |
|  |  |  |  |

ACTIVE OBJECT MANAGING TABLE

| OBJECT ID | CLASS NAME | ... |
|---|---|---|
| 112233 | CLASS X | ... |
| . | . | ... |
| . | . | ... |

FIG. 19a

FREE OBJECT MANAGING TABLE

| OBJECT ID | PRIORITY | CLASS NAME | ... | LAST ACCESS TIME |
|---|---|---|---|---|
| 223344 | 1 | CLASS A | ... | 08:08:08 |
| 334455 | 2 | CLASS B | ... | 07:07:07 |
| . | . | | ... | |
| | | | | |

FIG. 19b

ACTIVE OBJECT MANAGING TABLE

| OBJECT ID | CLASS NAME | ... |
|---|---|---|
| . | . | ... |
|  |  | --- |
| . | . | ... |

FIG. 20a

FREE OBJECT MANAGING TABLE

| OBJECT ID | PRIORITY | CLASS NAME | ... | LAST ACCESS TIME |
|---|---|---|---|---|
| 112233 | 1 | CLASS X | ... | 09:09:09 |
| 223344 | 2 | CLASS A | ... | 08:08:08 |
| 334455 | 3 | CLASS B | ... | 07:07:07 |
|  |  |  |  |  |

| | Validate | Order | Clear |

Order Form  82

Staff Name : Taro Yamada
Office Name : New York (Code : NO1)
Created Date : 08/30/1999  15:44:41

| Customer Name | [▼] | Customer Code | |
| Category | [▼] | | |
| Product Name | -- Please select the category -- [▼] | Product Code | |
| Quantity | | Requested Ship Date | 9/13/1999 |
| Discount Ratio | | Final Ship Date | |
| Amount | | Order Number | |

FIG. 22

[Figure 23]
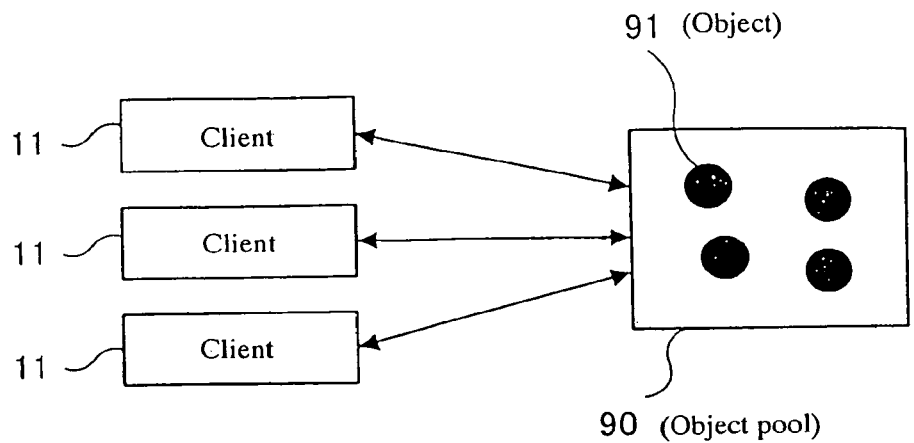
Figure 24
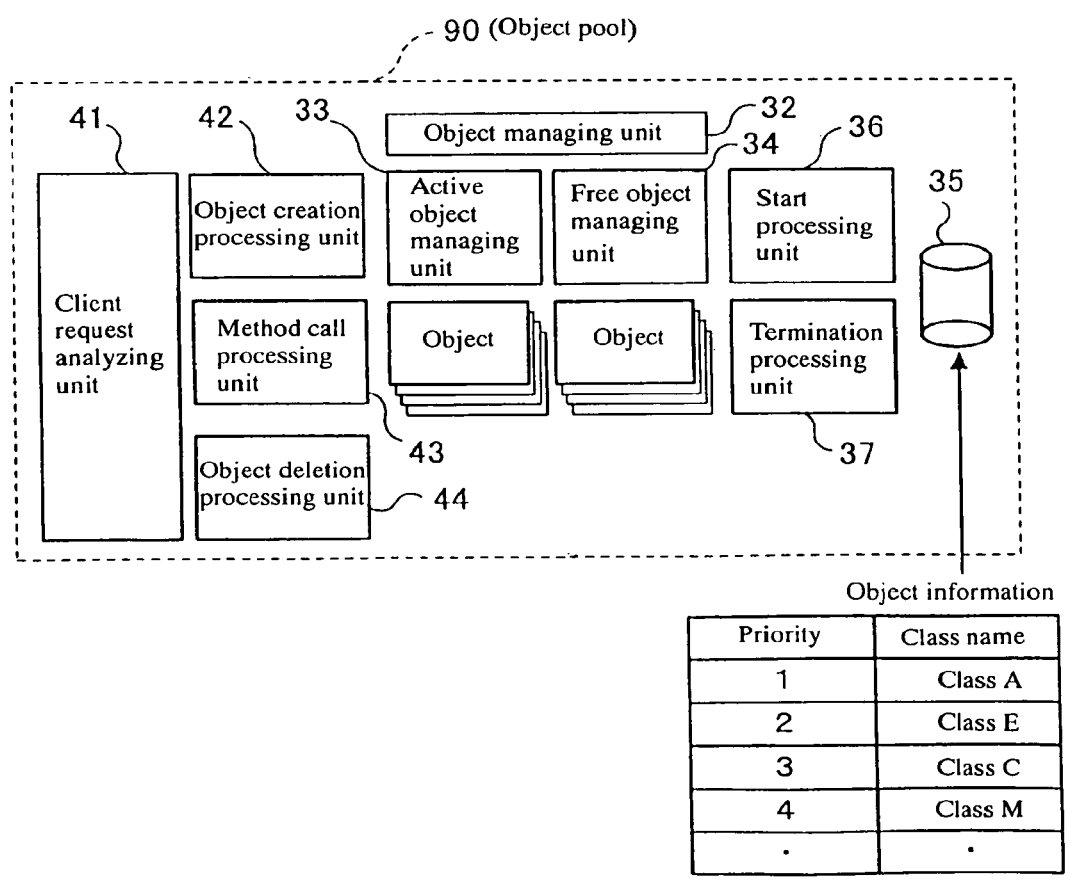

CLIENT SERVER SYSTEM AND METHOD FOR EXECUTING AN APPLICATION UTILIZING DISTRIBUTED OBJECTS

CROSS-REFERENCE TO RELATED APPLICATION

This application is a Divisional of U.S. application Ser. No. 12/123,852, filed May 20, 2008, entitled "CLIENT SERVER SYSTEM AND METHOD FOR EXECUTING AN APPLICATION UTILIZING DISTRIBUTED OBJECTS," which is a continuation of U.S. patent application Ser. No. 09/651,585, filed Aug. 29, 2000, the entirety of which is incorporated herein by reference.

FIELD OF THE INVENTION

The present invention relates to a client server system which executes an application utilizing distributed objects.

BACKGROUND OF THE INVENTION

Recently, application forms based on Web browsers have been rapidly increasing, and the distributed object use has largely changed. Specifically, the method of creating an object on a server directly from a client was previously dominant, but, at present, an application model has been spread in which objects are created on other servers using the distributed object technology on a Web server or a Web application server. Actual implementation examples include the combination of ASP and MTS (trademarks of Microsoft Corporation), or the combination of WebSphere and ComponentBroker (trademarks of IBM Corp.).

Distributed objects are made from data, applications, or processes and the like, and can be accessed from any place in a network and used for tasks. More specifically, they enable an object oriented method call to be remotely operated, and constructed as middleware implementing an object-oriented programming interface in the upper layer of the socket level. In the distributed object programming technique, an object in a remote machine appears in the local machine as if it were a mirage, and the remote object can be freely manipulated by operating on it. The distributed object mirage is called a proxy object (agent object), which is apparently the same as the object on the remote machine (actual object: remote object), but it exists as an agent rather than a real object, and the first access point for the client is a Web server instead of the actual server.

When the distributed object environment is used, the object creation process is the highest software cost. As a matter of fact, the creation process of the remote object of the distributed object is known for taking longer than any other process, and the key to shortening overall response time is how fast the object creation process is made. If the object pooling technique in a database management system, as described in Published Unexamined Patent Application No. 10-11339, is redirected to create objects prior to the access from a client, and an object can be passed from the pool when the object creation is requested from the client, then the response time can be shortened.

However, since the existing pooling technique, as described in the above-mentioned publication, is a mechanism in which, upon receipt of the request from a client, those which have already been used are pooled, the pooling mechanism is not effective when starting up the server, and thus it is difficult to achieve the determined response time. Further, in a database system in which the request from a client is clear, as in the existing technique, it is possible to simply create a predetermined object at the initialization. However, in an environment in which the object to be created is not known until the time of execution, such as a distributed object rather than the predetermined object as in the database, a sufficient effect cannot be obtained by only implementing the existing pooling mechanism.

Further, in the conventional object pool, the pooling is performed at the request of releasing to a created object, and then, an object in the pool is assigned to the client at the request of creation to the same class, thereby increasing the performance, but valid objects are not always pooled. Specifically, if proxy objects are pooled in an application utilizing distributed objects, proxy objects which have already become invalid on the server may be assigned at the request of object creation from the client. If such inconsistency occurs, an error is produced, for instance, when the client uses an object which has already become invalid, and the object pool becomes meaningless. It is possible to keep the validity of an object by setting an expiration date for each object, and automatically deleting objects which are not used for a certain period of time, but, with this function, there still remains a risk of deleting valid objects from the pool.

There is also an implementation form of an object pool which takes the above problems into consideration to provide a function in which a specified method is called out when releasing an object, and in this method, control can be made as to whether or not the object can be pooled according to the logic implemented by the user. This method is fully flexible in that the user can freely control the movement of an object. However, the burden on the user is much larger, and the process is always routed through that logic which increases the amount of processing. Furthermore, since behavior at the time of using the pool is built in as the implementation of objects, it is difficult to control the operation when no object exists, such as the time of starting up an application.

SUMMARY OF THE INVENTION

The present invention was made to solve the above-mentioned technical problems, and its object is to shorten the response time when an object creation is requested from a client for the first time after start-up of the server.

Further, it is another object to increase the utility of the object pool by synchronizing an application and the object pool.

Under such objects, the present invention is a client server system using distributed objects, comprising: a client connected to a communication network, and for performing an access request to an object; an application server for performing an application by an actual object according to the access request by the client; and an object pool server connected to the client through the communication network and connected to the application server, and for pooling a proxy object corresponding to the actual object and holding actual object management information that is the information on the actual object, wherein the application server notifies the object pool server of an event according to a change in the status of the application, and the object pool server automatically updates the actual object management information according to the notification of the event from the application server.

If it is characterized in that the event notified from the application server is formed according to at least one of the result of a process of starting a project and the result of a process of stopping the project, it is preferred also in the point that the risk of assigning an object which actually is not usable to a client can be excluded.

The process of stopping the project also includes the stopping process by abnormal termination of the project, as well as that related to the request to stop the project by the user of the application server.

Further, it is not always required that the application server and the object pool server are in different housings, but they may belong to the same housing.

Further, the present invention is an object pool using distributed objects, comprising: a client request analyzing unit for analyzing the access request to an object; an object information storage unit for storing the object information at the termination process of the object pool; an object creating unit for creating an object at the starting process of the object pool according to the object information stored by the object information storage unit; and an object managing unit for pooling the object created by the object creating unit before accessing the object from the client.

If it is characterized in that the object information stored by the object information storage unit is configured so that it can be at least recognized to be the last accessed object, and the object creating unit starts creation from the last accessed object, then it is particularly effective as an object pool since the last accessed object is very likely used again.

If the object information is configured so that it is given priority, it is preferred in the point that objects can be dynamically pooled. As the priority, any of the last access time, the number of accesses (frequency) or the like can be selected depending on the implementation form.

Further, the client server system using distributed objects of the present invention comprises: an object pool connected through a communication network to a client which sends an access request to an objects, and for pooling objects and managing the object information; and an application execution environment connected to the object pool for executing an application according to the access request of the client, and notifying the object pool of an event according to the status change of the application, wherein the object pool updates the object information according to the event notification from the application execution environment.

It can also be characterized in that an object pool server having the function of the object pool and an application server in the application execution environment are connected to each other through a network or the like, and the object pool server pools objects as proxy objects.

Further, the object pool and the application execution environment are formed on the same server.

Further, the present invention is an object pooling method for pooling objects in advance on a specified server to execute an application in a distributed system, comprising the steps of: storing object information when the process of the server is terminated; creating objects according to the object information when the process of the server is started; and pooling the created objects.

If it is characterized in that the object information is stored with a predetermined priority, and the objects are created in descending order with respect to priority, it is preferred in the point that the user's constant demand for the response time can be satisfied.

As the use of this priority, for instance, it is possible to remove the object of the lowest priority from the pool and actually delete it when the number of managed free objects reaches the maximum pool number. Further, if it is constructed so that at the starting process of the server process, objects are created from the data reserved at the time of termination, in descending order with respect to priority, until the initial pool number is reached, then it is excellent in the point that the determination of objects to be used by a client can be dynamically performed to shorten the response time for the client request. Further, the present invention is an object pooling method on a client server system which is connected through a communication network to a client which sends an access request to an object, and is connected to an application execution environment in which an actual object is executed, the object pooling method comprising the steps of: pooling a proxy object corresponding to an actual object in the application execution environment; storing the management information on the actual object; recognizing a change in the status of the actual object in the application execution environment; and updating the stored actual object management information according to the recognized status change. Specifically, if it is configured so that the status change can be recognized by an event which is an asynchronous signal, it is preferred in the point that synchronization can be established between an application on the server and an object in the object pool with a minimum cost.

Further, the present invention is a storage medium in which a program to be executed by a computer is stored so that it can be read by the input means of the computer, wherein the program makes the computer execute: a monitoring process for monitoring the execution status of a project which executes an application utilizing distributed objects; an event creating process for creating an event according to the execution status of the project monitored by the monitoring process; and an event issuing process for issuing the event created by the event creating process.

If it is characterized in that the event issuing process issues an event to an object pool server connected through a network or the like, a series of processes can be inputted using the storage medium, for instance, on the application server executing an application, and thus it is excellent in the point that an application on the server can be synchronized with an object in the object pool with a minimum cost. In addition, the storage medium includes those for selling software, whatever types of them, such as CD-ROM and floppy disk.

Further, the present invention is a storage medium in which a program to be executed by a computer is stored so that it can be read by the input means of the computer, the computer being connected through a network or the like to an application server for executing an application utilizing distributed objects and to a client which requests the execution of the application, wherein the program makes the computer execute: an object pooling process for pooling the proxy objects corresponding to the actual objects to be executed by the application server: and an updating process for receiving the event issued from the application server, and updating the management information on the actual object according to the event. It is excellent in the point that it is possible to easily execute the software for the object pool server.

Further, if it is characterized in that the computer is made to further execute: an execution status managing process for keeping track of the execution status of the objects, and managing them for each object: a request analyzing process for analyzing a request including an object creation request and/or an object deletion request from the client: and a process for executing, upon receipt of the result of the request analysis by the request analyzing process, the creation of an object and/or the deletion of an object according to the management result by the execution status managing process, it is preferred in the point that the status change of an application executed on the application server can be appropriately grasped to automatically update an object in the pool. In addition, any type of storage medium is accepted, as accepted as described above.

Further, when applied to a program sending apparatus, the present invention is characterized by comprising: storage means for storing a software product which makes a computer execute an event forming program for forming an event according to a change in the status of an application utilizing distributed objects, and an object pooling program for pooling objects according to the event formed by the event forming process: and sending means for reading out the program from the storage means, and sending the software product.

Furthermore, the program sending apparatus of the present invention is characterized by comprising: storage means for storing a program which makes a computer execute an object pooling process for pooling, on a server, objects associated with the execution of an application utilizing distributed objects, an information storing process for storing object information in the server, and a creation sequence determining process for determining the sequence of objects to be created according to the object information stored by the information storing process; and sending means for reading out the program from the storage means, and sending the program. By such program sending apparatus, the technique of the present invention can be provided to users without through a storage medium such as CD-ROM as a form for providing the program.

BRIEF DESCRIPTION OF THE DRAWINGS

For a more complete understanding of the present invention and for further advantages thereof, reference is now made to the following Detailed Description taken in conjunction with the accompanying Drawings, in which:

FIG. 3 is a table showing the event notification managing table created in an event creation unit of the present invention;

FIG. 4 is a table showing the project execution monitoring table updated in a project execution monitoring unit of the present invention;

FIG. 6 is a table showing an active object managing table used in an active object managing unit of the present invention;

FIG. 7 is a table showing a free object managing table used in a free object managing unit of the present invention;

FIG. 8 is a table showing an object pool property managing table of the present invention;

FIG. 9 is a table showing a pool object information stored in an object information storage unit of the present invention;

FIGS. 19(a) and 19(b) show an example of each table entry prior to processing an object deletion request;

FIGS. 20(a) and 20(b) show an example of each table entry prior to processing an object deletion request;

FIG. 22 is a drawing showing the picture image of a client application;

FIG. 23 explains an overall configuration of the client server system in accordance with the present invention; and FIG. 24 explains a functional block of an object pool.

DETAILED DESCRIPTION OF THE INVENTION

Embodiment 1

Figure 1:
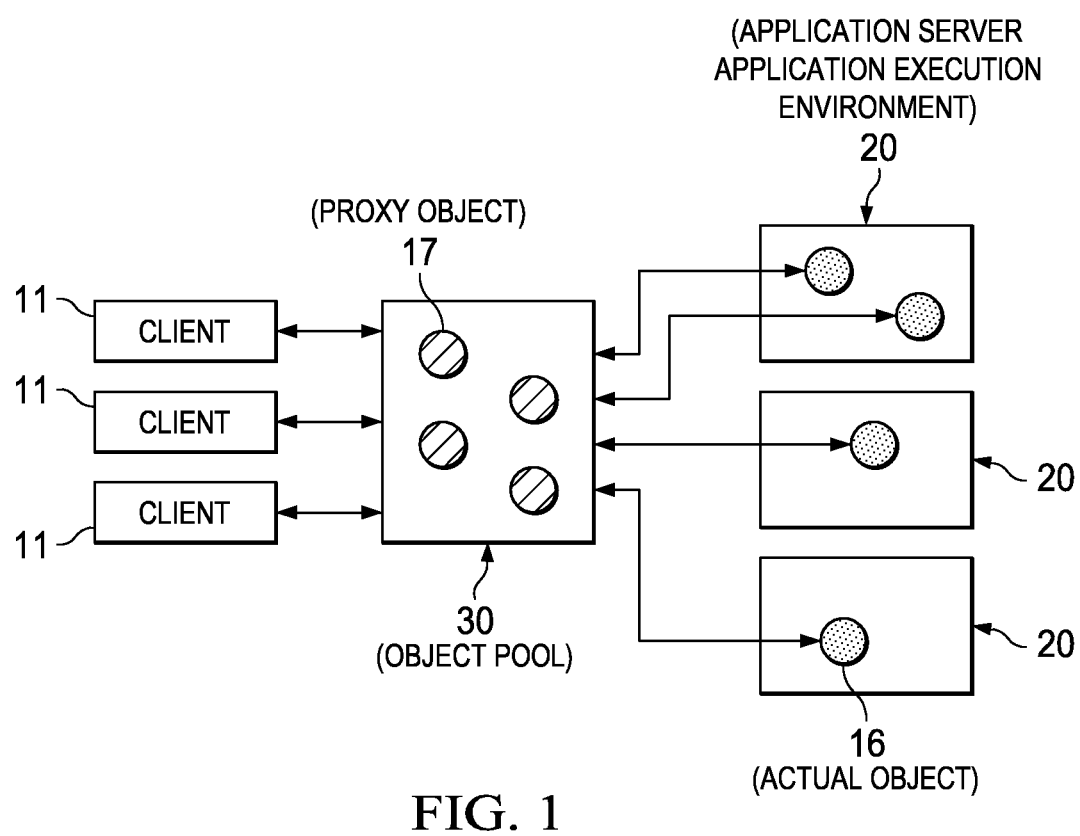
FIG. 1 illustrates the overall configuration of the client server system in an embodiment of the present invention.

FIG. 1 illustrates the overall configuration of the client server system in this embodiment. In the same drawing, reference numeral 11 indicates a client, which issues various requests such as an object creation request and an object deletion request, and the client program requests execution of service by performing a method call to an object. Further, reference numeral 20 indicates an application server as an application execution environment. Reference numeral 30 is an object pool, which is connected to the client 11 via a WAN (Wide Area Network) or a LAN (Local Area Network), and is also connected to an application server 20. An actual object 16 exists in the application server 20, and a proxy object 17 is an agent object for the actual object 16 which exists in the object pool 30.

Figure 2:
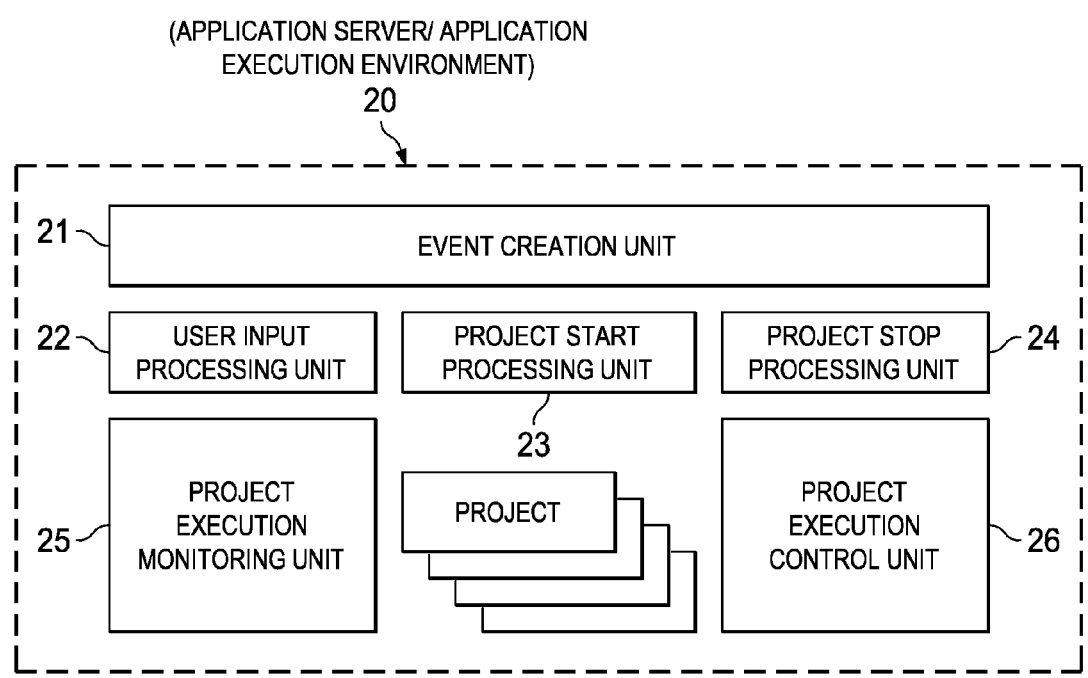
FIG. 2 illustrates a functional block of the application execution environment.

FIG. 2 illustrates a functional block of the application server 20 which is an application execution environment. The project shown in the same figure is an execution unit for a collection of applications and is constructed so that applications can be executed by a single or a plurality of objects. An event creation unit 21 creates an event according to the execution status of the project, and issues an event to an event processing unit 31 (described later) of the object pool 30, and a user input processing unit 22 analyzes the contents of a request from a user, who is the operator of the application server 20. An event is an asynchronous signal for the event supplier to communicate a certain phenomenon to a consumer. Further, a project start processing unit 23 initiates the start-up of the project upon request of the user input processing unit 22. A project stop processing unit 24 executes a termination process of the project. A project execution monitoring unit 25 monitors execution of the project, and asks the event creation unit 21 to create an event. Further, a project execution control unit 26 executes the preprocessing or postprocessing of the project, and performs the overall control among each project.

FIG. 3 shows an event notification managing table created in the event creation unit 21. The event notification managing table forms a table which enables the correspondence between an object pool ID which is the ID of the object pool 30, a host name which is the name of the object pool 30, and an event filter. The event filter shows which object pool 30 an event is issued depending upon a status change having occurred in the application. For instance, if it is "All," it is controlled to issue an event when any status change has occurred, if it is "Only Error," it is controlled to issue an event for an error condition, and if it is "Warning," it is controlled to issue an event for an unexpected warning condition. Based on the information registered in the event managing table, the event creation unit 21 issues an event to a predetermined object pool 30 for a predetermined status change.

FIG. 4 shows a project execution monitoring table updated in the project execution monitoring unit 25. The project execution monitoring table provides correspondence between a project ID which is the ID of a project to be executed in the application server 20, a project name which is the name of the project, and execution status in the project. The project execution monitoring table is constructed so that it is updated according to the result of the starting process of the project from the project start processing unit 23, and the issuance of an event by the event creation unit 21 is enabled according to the updated project execution monitoring table.

Figure 5:
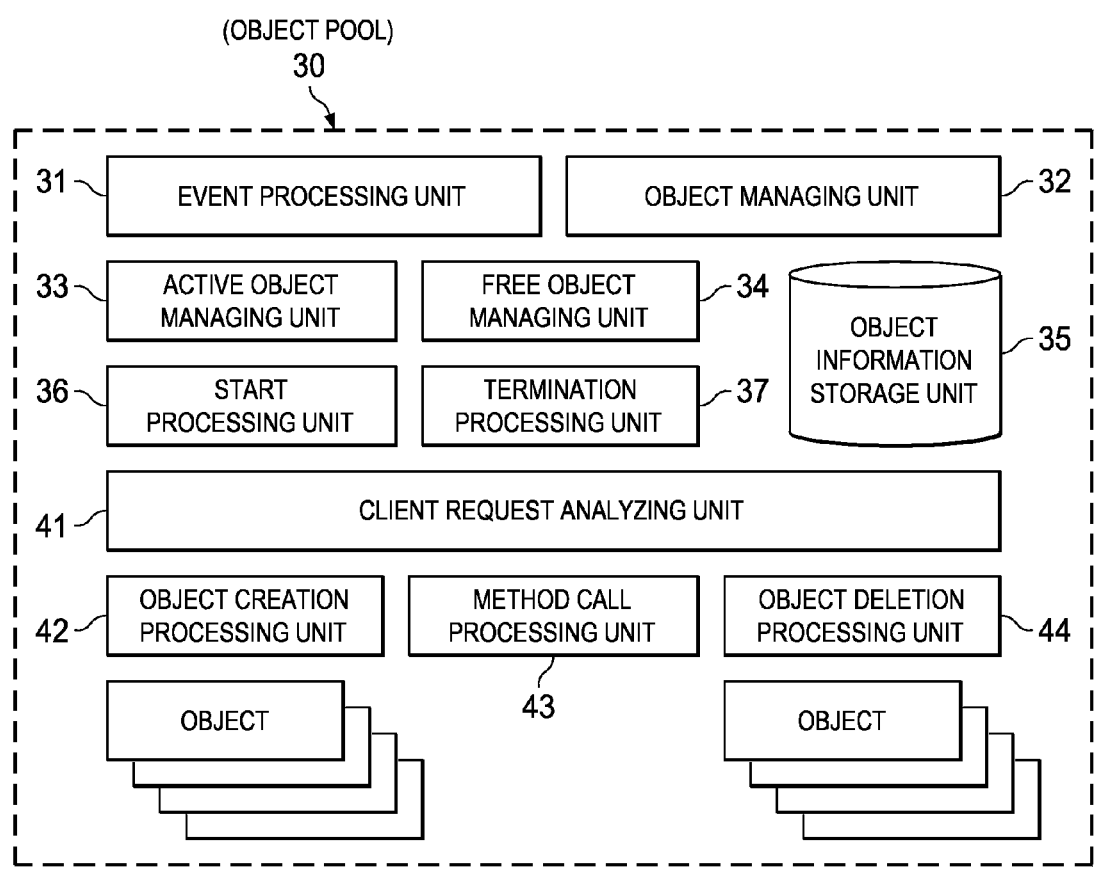
FIG. 5 illustrates a functional block of an object pool of the present invention.

FIG. 5 explains the functional block of the object pool 30. In the FIG. 5, an event processing unit 31, an object managing unit 32, and the event processing unit 31 notify the object managing unit 32 of a change of the object execution status according to the event notified from the event creation unit 21 of the application server 20. Further, an active object managing unit 33 manages objects already assigned to the client 11. A free object managing unit 34 manages objects which are not assigned to the client 11. Further, an object information storage unit 35 consists of a hard disk or the like, and for example, it reads the object information at the termination of the object pool 30 and stores it. Furthermore, a start processing unit 36, and a termination processing unit 37 respectively perform the reading or storing of the object information from the object information storage unit 35 at the starting (at the initial time) or termination time of the object pool 30.

Further, in FIG. 5, is a client request analyzing unit 44 analyzes the contents of a request from the client 11, and an object creation processing unit 42 performs a request to acquire an object to the object managing unit 32 at the request of the client request analyzing unit 41. A method call processing unit 43, which upon receipt of a request to process a method call from the client 11, demands the object requested for processing from the object managing unit 32 at the request of the client request analyzing unit 41. Further, an object deletion processing unit 44 asks the object managing unit 32 to delete the object at the request of the client request analyzing unit 41. The request from the client 11 received by the client request analyzing unit 41 can be constructed, for instance, so that when a specified client 11 opens a Web homepage, or downloads a homepage, a predetermined program is invoked, and after a request to create an object is issued and, for instance, an applet operates on the Web page, the object pool 30 on the server is requested to create an object. The request from the client 11 depends on the implementation form, and for instance, the implementation can be provided in a form in which an object creation button is provided on the order form screen shown in FIG. 22 to be described later.

FIG. 6 shows the active object managing table used in the active object managing unit 33. In this table, object ID shows the ID of an object already assigned to the client 11. Further, class name shows a so-called class defining the function or nature of an object for each object. Furthermore, server name is to manage the application server 20 for which the object is performed on an object basis, and project name correspondingly manages projects which are an execution unit for a collection of applications. In addition, the item of execution status manages the execution status of an object after being assigned to a client, and the object belonging to the project notified from the event processing unit 31 is selected and updated by the object managing unit 32, and the updated contents are registered in the item.

FIG. 7 shows the free object managing table used in the free object managing unit 34, and objects, which are already created but not used by any client, are managed by this table. The priority in this table is determined by the last access time of the object or the like, and it is an important factor in the dynamic object pool formation under the distributed object environment, for instance, when object information is stored in the object information storage unit 35 with priority at the time of terminating processing of the object pooling by the termination processing unit 37, or the initial pooling is performed in descending order at the time of start processing of the object pooling. Further, this priority is also used to start deletion of an object with the lowest priority when the number of free objects reaches the maximum pool number. Further, object ID shows the ID of an object which was already created, but not assigned to the client 11, and class name shows the class of the object. Further, server name manages the application server 20 for which an object is executed, and project name correspondingly manages the project of it. Execution status shows the execution status on the application server 20. As the management of the execution status, it is possible to perform fine status management not only during a halt but also a recovery process, a temporary halt or the like.

FIG. 8 shows an object pool property managing table for managing various information on the object pool. In this table, the maximum pool number and the initial pool number are managed as property, and these numbers allow the deletion of pooled objects or the creation of objects at the initial time to be dynamically controlled.

Further, FIG. 9 shows the pool object information stored in the object information storage unit 35. The class name of an object, the server name of the executing application server 20, and the project name to be performed in the server are, respectively, stored along with priority. According to the stored information, a dynamic object pooling is performed at the initial time, which is the time of start processing. By managing the object information with various table structures, the data model is easy to understand, and retrieval speed can be increased.

Figure 10:
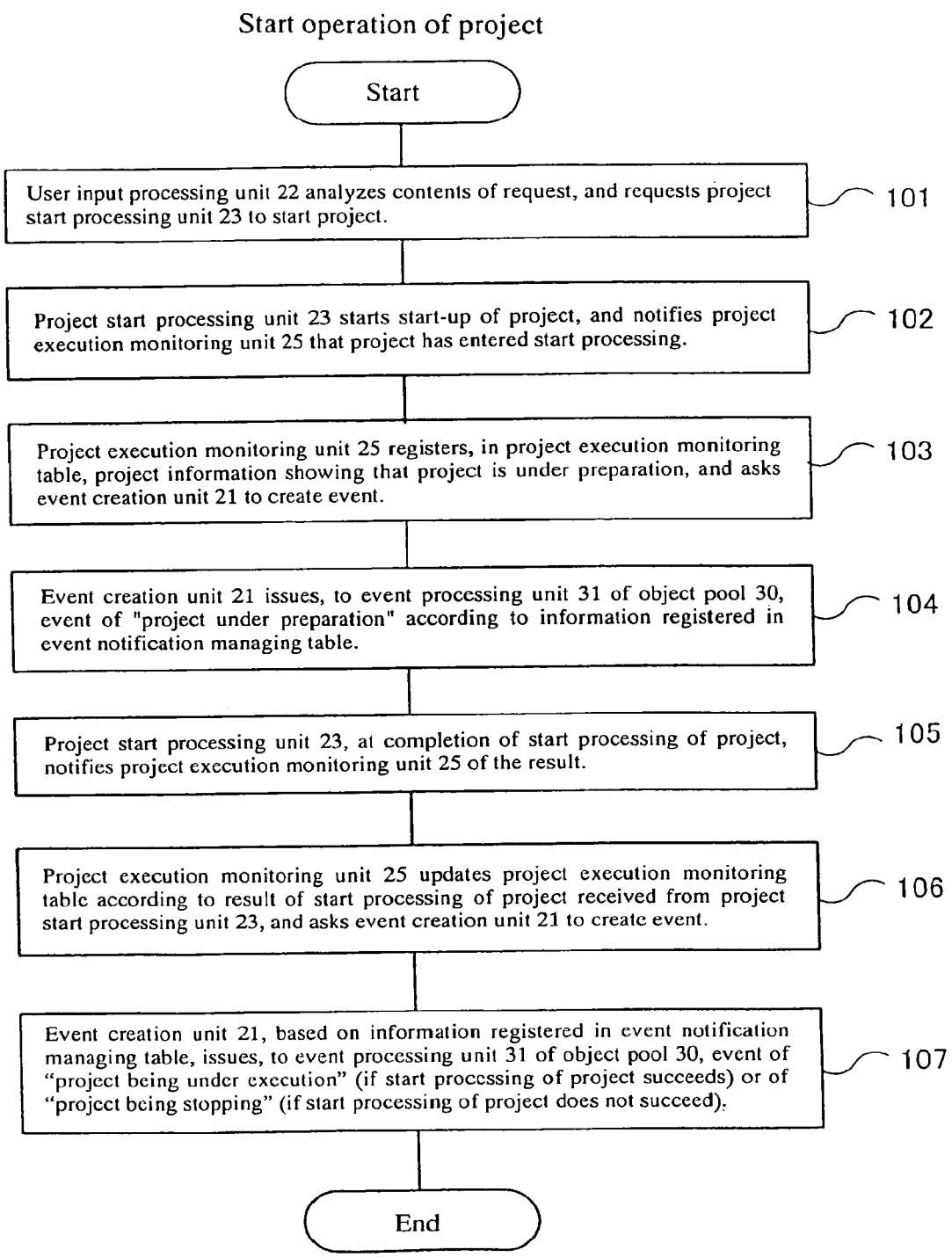
FIG. 10 is a flowchart explaining a start operation of a project.
Figure 11:
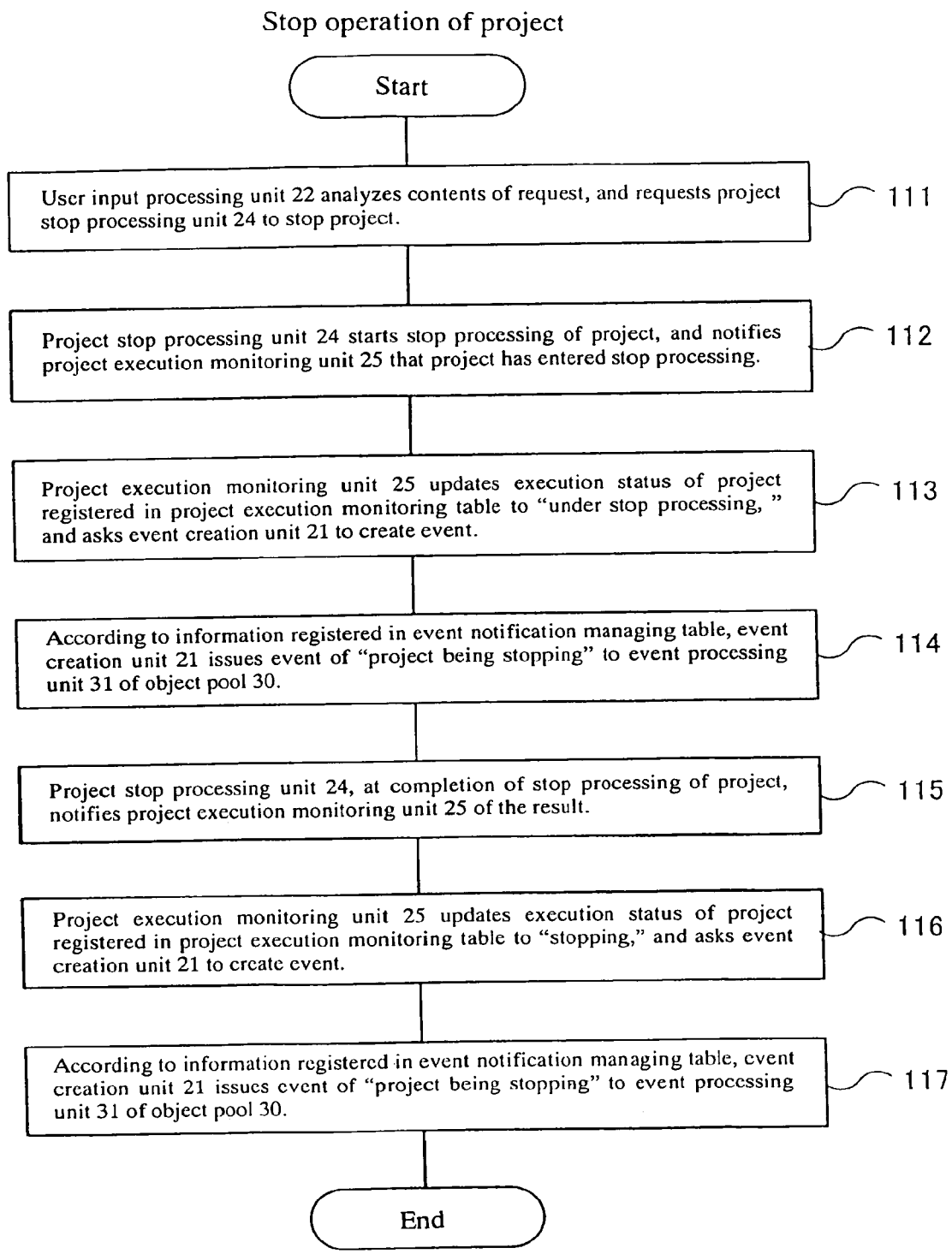
FIG. 11 is a flowchart explaining a stop operation of a project.

Now, the operation of starting a project in the application server 20 that is an application execution environment is described using the flowchart of FIG. 10. First the user input processing unit 22 analyzes the contents of the request input by the user of the of the application server 20, and requests the project start processing unit 23 to start the project (block 101). Upon receipt of the start request, the project start processing unit 23 initiates the start-up of the project, and notifies the project execution monitoring unit 25 that the project has entered the start processing (block 102). Entering the start processing, the project execution monitoring unit 25 registers the project information showing that the project is under preparation in the above-mentioned project execution monitoring table, and asks the event creation unit 21 to create an event (block 103). According to the information registered in the above-mentioned event notification managing table, the event creation unit 21 issues the event of "project under preparation" to the event processing unit 31 of the object pool 30 requiring an event issuance (block 104). On the other hand, when the start processing of the project is completed, the project start processing unit 23 notifies the project execution monitoring unit 25 of the result of the processing (block 105). According to the result of the project start processing received from the project start processing unit 23, the project execution monitoring unit 25 updates the project execution monitoring table, and asks the event creation unit 21 to create an event (block 106). According to the information registered in the event notification managing table, the event creation unit 21 issues, to the event processing unit 31 of the object pool 30, an event of "project under execution" (if the start processing of the project succeeds) or of "project is stopping" (if the start processing of the project does not succeed) (block 107), and the project start operation is terminated. The stop operation of a project in the application server 20 is now described in conjunction with the flowchart of FIG. 11. First, the user input processing unit 22 analyzes the contents of the request input by the user of the application server 20, and requests the project stop processing unit 24 to stop the project (block 111). Upon receipt of this request, the project stop processing unit 24 starts the project stop processing, and notifies the project execution monitoring unit 25 that the project has entered the stop processing (block 112). The project execution monitoring unit 25, having received the notification, updates the execution status of the project registered in the above-mentioned project execution monitoring table to "under stop processing," and asks the event creation unit 21 to create an event (block 113). The event creation unit 21 having received this request issues, to the event processing unit 31 of the object pool 30, an event of "under project stop processing" according to the information registered in the event notification managing table (block 114). When the project stop processing is completed, the project stop processing unit 24 notifies the project execution monitoring unit 25 of the result of it (block 115). Having received this notification, the project execution monitoring unit 25 updates the project execution status registered in the project execution monitoring table to "stopping," and asks the event creation unit 21 to create an event (block 116). Having received this request, the event creation unit 21 issues an event of "project is stopping" to the event processing unit 31 of the object pool 30 according to the information registered in the event notification managing table (block 117), and the series of stop operations is terminated.

Figure 12:
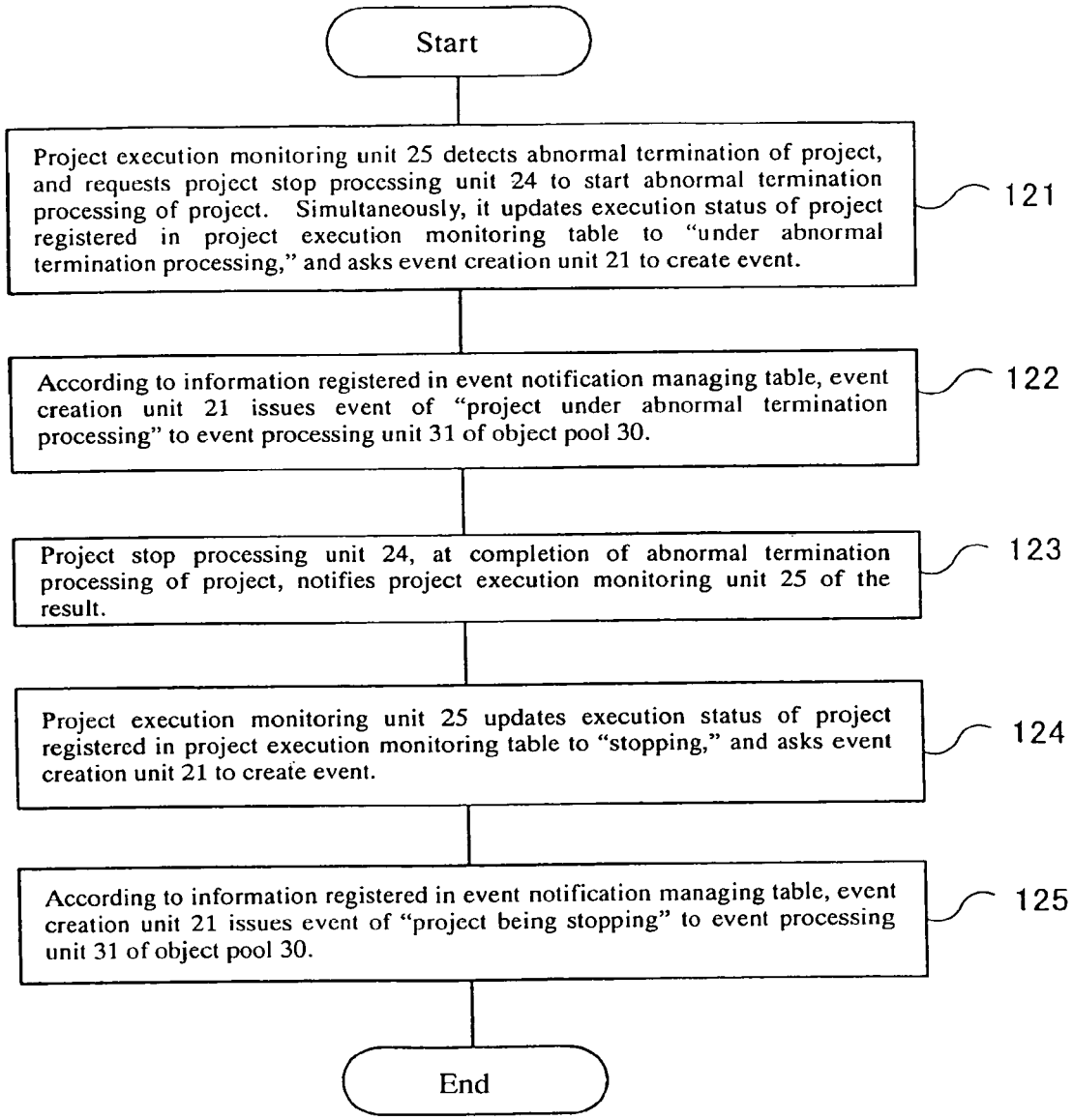
FIG. 12 is a flowchart explaining an abnormal termination processing operation of a project.

The abnormal termination processing operation of a project in the application server 20 is described using the flowchart of FIG. 12. If a project abnormally terminates for some reason, the project execution monitoring unit 25 detects the abnormal termination of the project, and requests the project stop processing unit 24 to start the abnormal termination processing of the project. Simultaneously, it updates the project execution status registered in the above-described project execution monitoring table to "under abnormal termination processing," and asks the event creation unit 21 to create an event (block 121). According to the information registered in the event notification managing table, the event creation unit 21 issues an event of "project under abnormal termination processing" to the event processing unit 31 of the object pool 30 (block 122). On the other hand, when the project abnormal termination processing is completed, the project stop processing unit 24 notifies the project execution monitoring unit 25 of the result (block 123). Upon receipt of this notification, the project execution monitoring unit 25 updates the project execution status registered in the project execution monitoring table to "stopping," and asks the event creation unit 21 to create an event (block 124). Having received this request, the event creation unit 21 issues an event of "project is stopping" to the event processing unit 31 of the object pool 30 according to the information registered in the event notification managing table (block 125), and the abnormal termination processing operation of the project is terminated.

Figure 13:
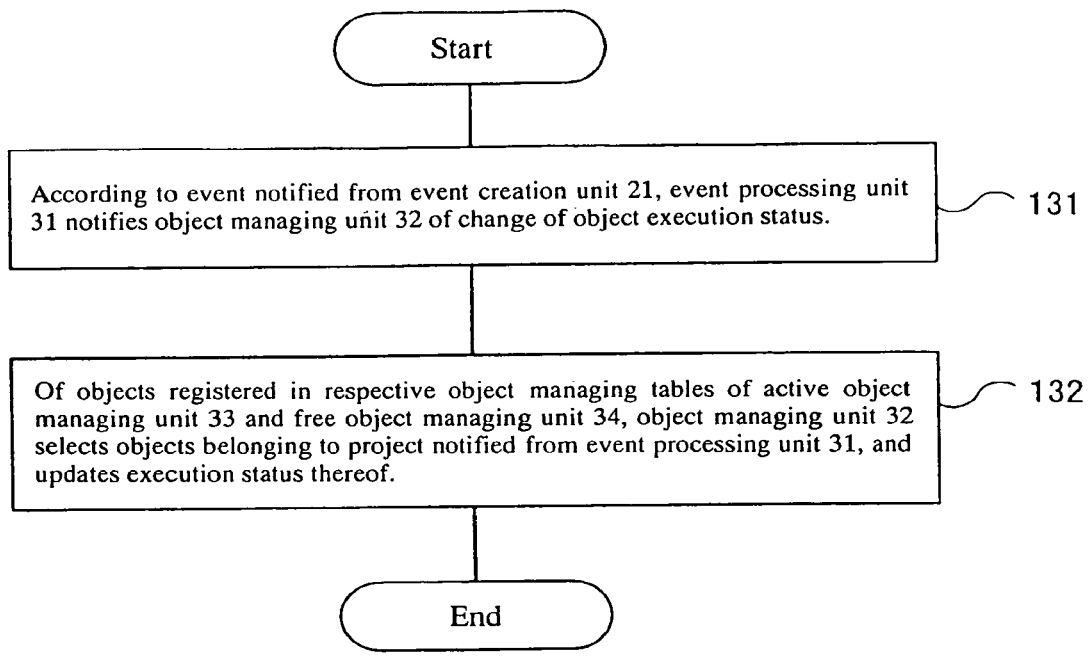
FIG. 13 is a flowchart explaining an operation for receiving an event.

As described above, an event is formed in the application server 20 which is an application execution environment, and the operation for the event receiving in the object pool 30 is described using the operation flow of FIG. 13. The object pooled in the object pool 30 is the proxy object 17, but the description is made using the word "object" for convenience.

According to the event notified from the event creation unit 21 of the application server 20, the event processing unit 31 in the object pool 30 notifies the object managing unit 32 of the change of the object execution status (block 131). Upon receipt of this notification, the object managing unit 32 selects the object belonging to the project notified from the event processing unit 31 among the objects registered in the respective object managing tables for the active object managing unit 33 and the free object managing unit 34, and updates the execution status of it (block 132).

As described above, in accordance with this embodiment, when the status of an application executed in the application server 20 changes, the application server 20 itself notifies the object pool 30 of an event, whereby the status of the application server 20 can be grasped in the object pool 30, and pooled objects can be automatically updated. As a result, the status change of an application executed in the application server 20 can be promptly accommodated, and it is possible to avoid the risk of assigning an object which is actually not usable to the client 11. In other words, the object pool 30 according to this embodiment not only simply pools objects, but also can always pool valid objects by grasping the status of the application on the application server 20. Thus, if an access request is made from the client 11 for an object which became invalid at a certain point of time, the information on the current objects can be directly communicated to the client 11 from the object pool 30, and a redundant processing such as access to the application server 20 can be omitted to allow the object pool 30 to be utilized more effectively.

Figure 14:
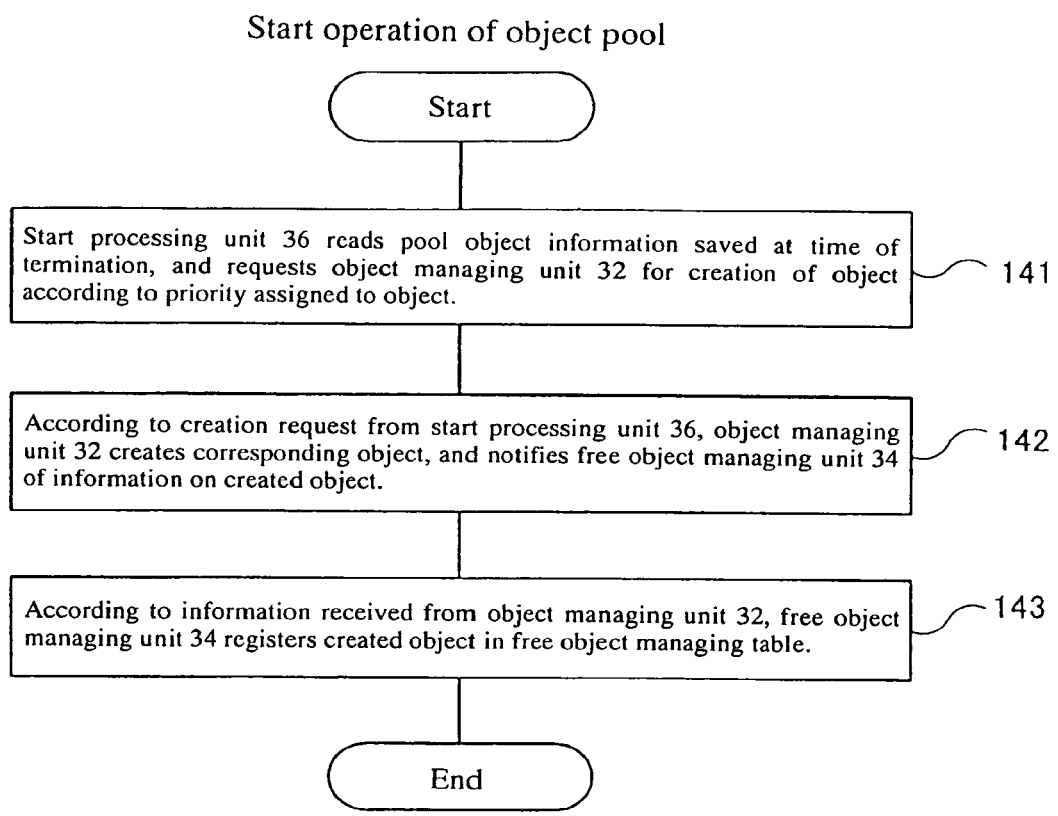
FIG. 14 is a flowchart explaining a start operation of an object pool.

The start operation (at the initial time) of the object pool 30 in this embodiment is now described using the flowchart of FIG. 14. First, the start processing unit 36 of the object pool 30 reads the pool object information saved at the time of termination from the object information storage unit 35, and requests the object managing unit 32 for the creation of an object according to the priority assigned to the object (block 141). The object managing unit 32 having received this creation request creates the corresponding object according to the creation request from the start processing unit 36, and notifies the free object managing unit 34 of the information on the created object (block 142). Having received this notification, the free object managing unit 34 registers the created object in the above-described free object managing table according to the information received from the object managing unit 32 (block 143).

Figure 15:
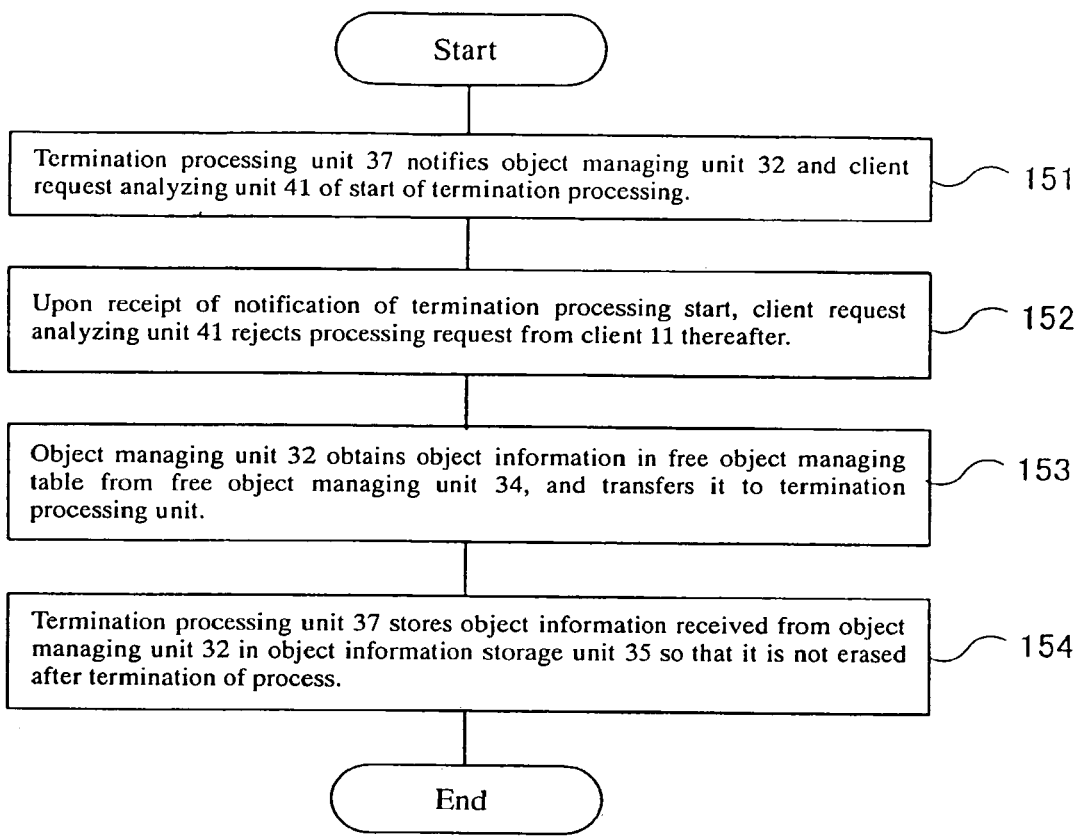
FIG. 15 is a flowchart explaining a termination operation of an object pool.

The termination operation of the object pool 30 is described using the flowchart of FIG. 15. First, the termination processing unit 37 of the object pool 30 notifies the object managing unit 32 and the client request analyzing unit 41 of the starting of the termination processing (block 151). The client request analyzing unit 41, having received this notification of the starting of the termination processing rejects the processing request from the client 11 thereafter (block 152). Then, the object managing unit 32 acquires the object information in the free object managing table from the free object managing unit 34, and transfers it to the termination processing unit (block 153). The termination processing unit 37 stores the object information received from the object managing unit 32 in the object information storage unit 35 so that it is not erased even after the termination of the process (block 154). The object information to be stored has such contents as shown in FIG. 9 described above, and according to the priority shown in FIG. 9, the start operation described in FIG. 14 is carried out, and objects are created, for instance, in descending order with respect to priority.

As described above, according to the termination operation and start operation of the object pool 30 in this embodiment, even in a distributed object which is not definite unlike a database, objects can be dynamically pooled, for instance, based on priority, and an effective object pool can be provided to an object which cannot be routed when pooled and is not clear until it is executed.

Figure 16:
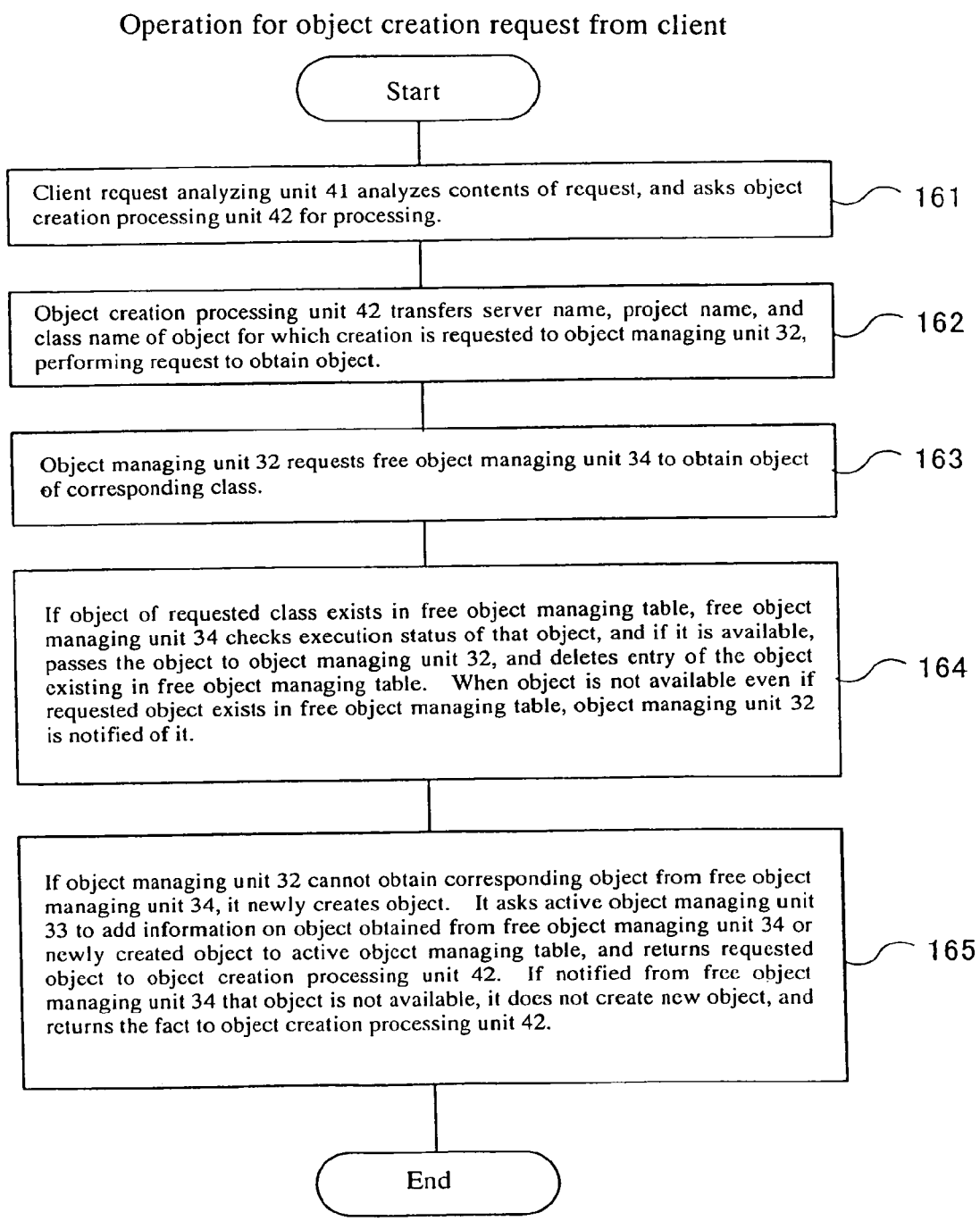
FIG. 16 is a flowchart explaining operation of an object creation request from a client.

Operation for the object creation request from the client 11 in this embodiment is described using the flowchart of FIG. 16. First, the client request analyzing unit 41 of the object pool 30 analyzes the contents of the request from the client 11, and asks the object creation processing unit 42 for the processing (block 161). The object creation processing unit 42, having received this request, transfers the server name, project name, and class name of the object requested to be created to the object managing unit 32, and requests the acquisition of the object (block 162). Having received this request, an object managing unit 32 requests the free object managing unit 34 to acquire the object of the corresponding class (block 163). If an object of the requested class exists in the free object managing table, the free object managing unit 34 having received this acquisition request checks the execution status of the object, and passes the object to the object managing unit 32 if it is available, and deletes the items of the object existing in the free object managing table. If the requested object is existing in the free object managing table, but it is not available, then the unit 34 notifies the object managing unit 32 of that (block 164). If the object managing unit 32 cannot obtain the corresponding object from the free object managing unit 34, it newly creates an object. It requests the active object managing unit 33 to add the information on the object obtained from the free object managing unit 34 or on the newly created object to the active object managing table, and returns the requested object to the object creation processing unit 42. If notified from the free object managing unit 34 that the object is not available, it does not create a new object and returns the fact to the object creation processing unit 42 (block 165), and the series of operations is terminated.

Figure 17:
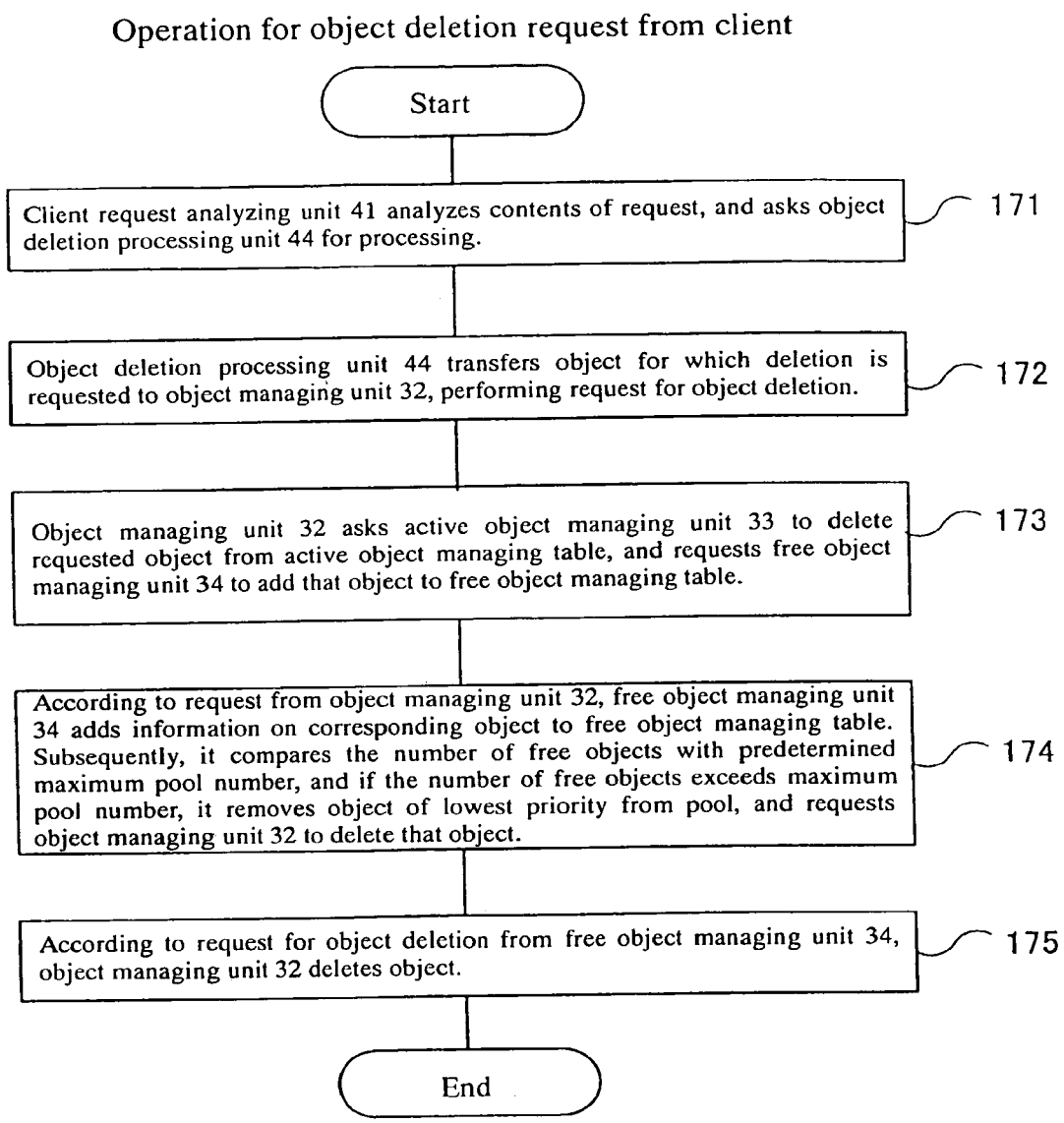
FIG. 17 is a flowchart explaining an object deletion request from a client.

The operation for the object deletion request from the client 11 is described below using the flowchart of FIG. 17. First, the client request analyzing unit 41 of the object pool 30 analyzes the contents of the request from the client 11, and asks the object deletion processing unit 44 for the processing (block 171). Having received this request, the object deletion processing unit 44 transfers the object requested to be deleted to the object managing unit 32, and requests the deletion of the object (block 172). The object managing unit 32 having received this request asks the active object managing unit 33 to delete the requested object from the active object managing table, and asks the free object managing unit 34 to add the object to the free object managing table (block 173). Having received this request, the free object managing unit 34 adds the information on the particular object to the free object managing table according to the request from the object managing unit 32. Subsequently, it compares the number of free objects with a predetermined maximum pool number (FIG. 8), and if the number of free objects exceeds the maximum pool number, it removes the object of the lowest priority from the pool, and requests the object managing unit 32 to delete the object (block 174). According to the object deletion request from the free object managing unit 34, the object managing unit 32 deletes the object (block 175), and the operation for the deletion request is terminated.

Figure 18:
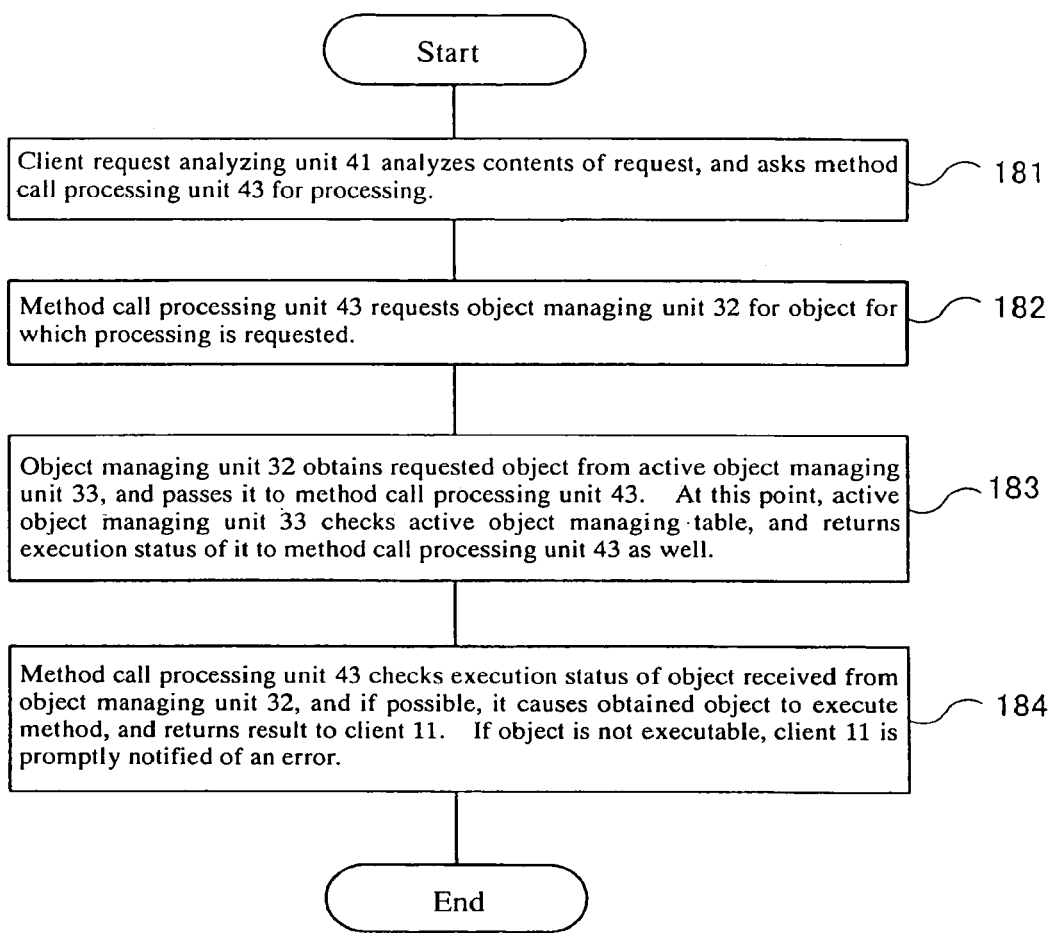
FIG. 18 is a flowchart explaining a method call processing request from a client.

The operation for the method call processing request from the client 11 is now described using the flowchart of FIG. 18. First, the client request analyzing unit 41 of the object pool 30 analyzes the contents of the request from the client 11, and asks the method call processing unit 43 for the processing (block 181). Upon receipt of this request, the method call processing unit 43 requests the object managing unit 32 for the object requested to be processed (block 182). The object managing unit 32, having received the request for processing, acquires the requested object from the active object managing unit 33, and passes it to the method call processing unit 43. At this point, the active object managing unit 33 checks the active object managing table, and also returns the execution status of it to the method call processing unit 43 (block 183). The method call processing unit 43 checks the execution status of the object received from the object managing unit 32, and if possible, it makes the object perform the method, and returns the result to the client 11. If the object is not executable, it promptly notifies the client 11 of an error (block 184), and the series of operations for the method call processing request is terminated.

In the termination operation of the object pool in this embodiment (FIG. 15), as to the object related to a project whose execution status in the free object management table (FIG. 7) is "stopping," and which is not started again, whether or not the project is to be erased is determined by the implementation form of it. However, if the object is erased from the free object management table when the project is completely terminated, an object creation is requested to the application server 20 executing an application when a request is received from the client 11, and an error is returned to the client 11 after waiting for the error response from the application server 20. On the other hand, if such object is not erased, an error can be returned to the client 11 without waiting for the response from the application server 20, so it is excellent in the point that a prompt response is provided.

Now, the update operation of priority in this embodiment is described using FIGS. 19 and 20. FIG. 19 (a) and FIG. 19 (b) show an example of each table entry before the object deletion request processing, and FIG. 20 (a) and FIG. 20 (b) show an example of each table entry after the object deletion request processing. First, the operation for the object deletion request from the client 11 is described. As shown in FIG. 19 (a) and FIG. 19 (b), it is assumed that, for instance, at a certain point of time, an object X having a class name X exists in the active object managing table, while objects A and B having class names A and B, respectively, exist in the free object managing table. If the client 11 requests the deletion of the object X, the object deletion processing unit 44 shown in FIG. 5 asks the object managing unit 32 to process it. Having received this request, the object managing unit 32 orders the active object managing unit 33 and the free object managing unit 34 to move the object X (FIG. 19 (a)) existing in the active object managing table to the free object managing table. At this point, if the last access time to the object is employed as the technique for calculating the priority, the free object managing unit 34 allocates the highest priority to the object X, and the priorities of the objects A and B are decreased, respectively. As a result, the active object managing table becomes as shown in FIG. 20 (a), and the free object managing table has the contents as shown in FIG. 20 (b).

The priority determining operation for the event receiving in the object pool 30 is described below by taking an example. According to the event notified from the event processing unit 31, the object managing unit 32 of the object pool 30 requests the active object managing unit 33 and the free object managing unit 34 to update the tables managed by them, respectively. At this point, the free object managing unit 34 changes the priority as well as the execution sequence. On the other hand, since the information on the priority is not held in the active object managing table, the active object managing unit 33 updates only the execution status of the object in the application execution environment (application server 20).

As the update of priority, for instance, if an event such as stop, temporary stop, or busy of a project is received, the one lowering the priority of the object is given. Further, for instance, an event such as completion of the start processing, or completion of execution preparation of a project is received, it is possible to provide a configuration so as to increase the priority of the object. In accordance with this embodiment, depending on the implementation form, priority can also be dynamically updated for events of various contents other than those given here, an effective object pool can be constructed by effectively determining the object which would be used by the client 11 at the start-up time when the object pool 30 is booted up.

Figure 21:
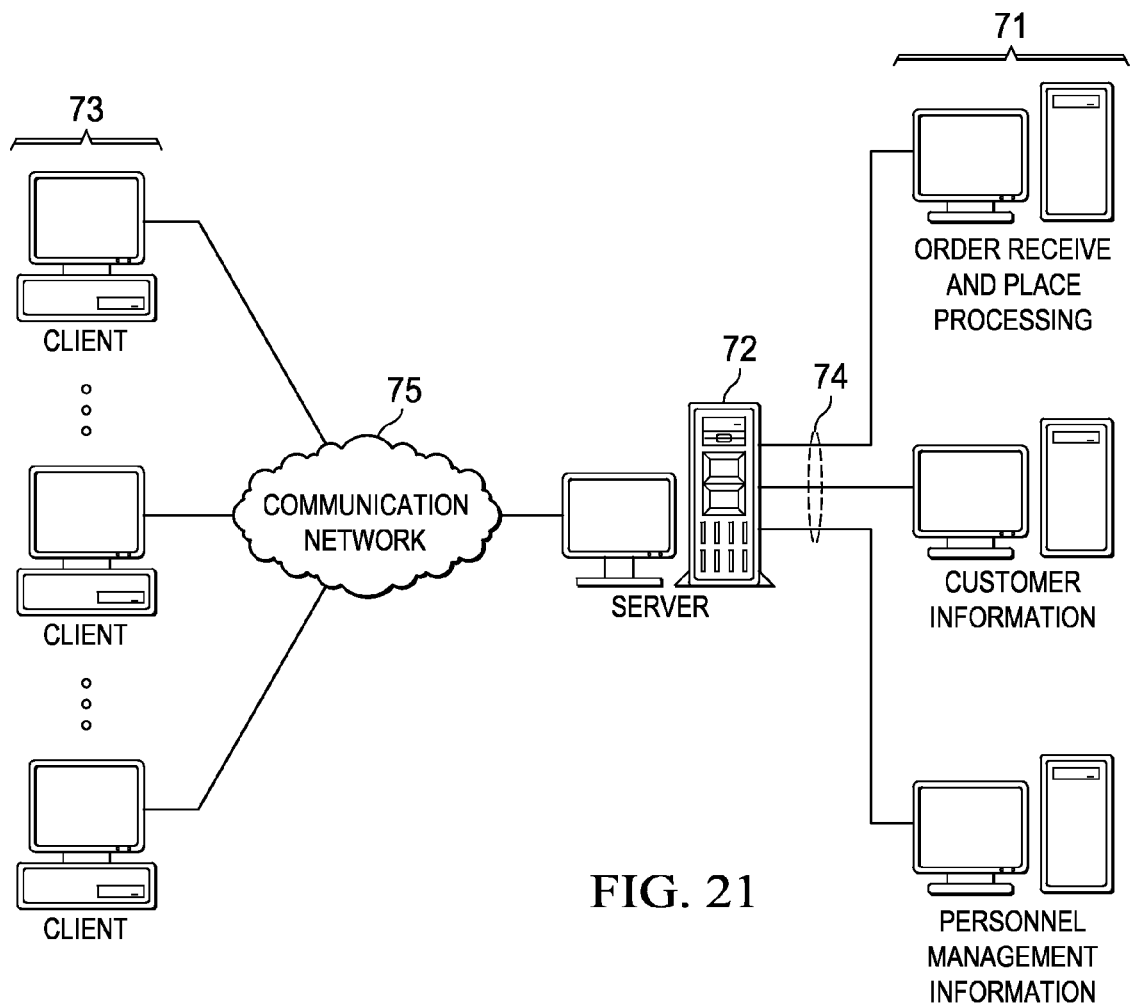
FIG. 21 illustrates an example of an application system in accordance with the present invention.

FIG. 21 shows an example of the application system using this embodiment. An application server 71 is an application execution environment for executing applications such as order receive and place processing, customer information, and personnel management information. Further, server 72 functions as the object pool in this embodiment, and is usually connected to the application server 71 through a communication network 74 such as LAN. A client 73 asks the server for a processing by requesting a desired activity, for instance, in the form of method, and receives the result of it, and is connected to the server 72 through a communication network 75 formed from WAN or LAN.

FIG. 22 illustrates an example in which one of the clients 73 orders an office product, such as stationary, over the Web. This application is an ordinary order receive and place processing program which allows goods to be ordered through the Web. First, the client 73 specifies a create object, namely, which server's order receive class (of the order receive processing work) is related to the desired object. This client can communicate with the server by using, for instance, an applet provided by the application server. An order button 82 existing on the Web page in a display 81 in FIG. 22 has a predetermined definition by HTML or JavaScript, and when the user depresses the order button 82, a predetermined function is invoked, and through the server 72, the "order" method defined in the application server 71 executing the order receive and place processing, or a remote server, is executed. The client 73 is configured so that it passes through the server 72 that is an object pool, and casts an inquiry of price or stock, purchase, cancellation, or the like onto the object as methods with respect to the order receive object. Further, in this embodiment, objects are used through the proxy objects pooled in the server 72, and since the server 72 recognizes the status change of the object which executes the project of order receive and place processing, for instance, if an abnormal termination occurs, the client 73 can be fast notified that it is not valid object, and a redundant processing can be omitted.

According to the first embodiment described above, the object pool performs pooling in the form of a proxy object and a separate application execution environment is provided. In another embodiment, the server, which is the application execution environment, functions as the object pool by itself.

Configurations similar to the first embodiment are assigned similar reference numerals, and the detailed description of them is omitted. FIG. 23 explains the overall configuration of the client server system in a second embodiment. An object pool 90 creates an object 91 as an application execution environment by itself, and functions as an effective object pool for a client 11.

FIG. 24 explains the functional block of the object pool 90. It has a configuration different from the object pool 30 (FIG. 5) in the first embodiment in that it does not include the event processing unit 31.

The flow of each processing is described with reference to FIG. 24. First, if an object creation is requested from the client 11, a client request analyzing unit 41 analyzes the type of the request, and asks the object creation processing unit 42 for processing. Having received this request, the object creation processing unit 42 asks an object managing unit 32 to acquire an object. The object managing unit 32 asks a free object managing unit 34, and if there is an object of the corresponding class, the object managing unit 32 passes it, otherwise it creates an object and passes it.

Further, if object deletion is requested from the client 11, the client request analyzing unit 41 analyzes the type of the request, and asks an object deletion processing unit 44 for processing. Upon receipt of this request, the object deletion processing unit 44 asks the object managing unit 32 to delete the object. The object managing unit 32 requests the free object managing unit 34 to register the object as a free object. If the number of free objects has already reached the maximum pool number, it removes the object of the lowest priority from the pool, and actually deletes it. This priority can be determined by the last access time of the object, or the like.

To terminate the server process which is the object pool 90, a termination processing unit 37 obtains from the free object managing unit 34 the list of the type and priority of objects, and saves it in an object information storage unit 35. On the other hand, at the initial time for starting the server process, a start processing unit 36 requests the object managing unit 32 to create an object from the data stored at the time of termination in descending order with respect to priority, until the initial pool number is reached. As a result, in the server under the application execution environment, the object which would be used by the client can be created in advance at the initial time under the application utilizing a distributed object, and it can function as an effective object pool. Specifically, by providing a configuration such that, for instance, the server process is terminated with the priority of the last accessed object being high, and the object creation is made from the last accessed object at the initial time according to that priority, it is possible to create first the last accessed object that is likely used again, so the usefulness of the object pool can be increased.

The software for executing these embodiments can be executed by installing it in each server through a storage medium such as CD-ROM. The installation includes an installation into the server functioning as the object pool 30 and an installation into the application server 20 in the embodiment 1, and includes an installation into the server functioning as the object pool 90 in the embodiment 2. Further, it can also be accomplished by downloading the software through a network or the like without through a storage medium such as CD-ROM except for the case in which it is previously installed in a storage medium such as a hard disk. This needs only a configuration in which storage means for storing a program and sending means for reading out and sending the program are provided in a PC or the like, and upon receipt of a request from another PC connected to the Internet or the like and executing the program, so that it is downloaded to that PC. Moreover, also for each client, the client server system in these embodiments can be formed with a similar program installation technique.

As described above, in accordance with the first and second embodiments, objects can be dynamically pooled when the object pool is booted up, and thus the processing time taken in the creation of objects in an application utilizing distributed objects can be effectively shortened. Further, in accordance with these embodiments, even for a model in which there are several application servers in the back end of the server connected from clients, and actual objects are created in the application servers, the status change of an application being executed in the server can be appropriately grasped, and thus valid objects can always be pooled.

Further, in accordance with the methods of these embodiments, since the managing objects within the application execution environment and the object pool directly execute the transmission and sending of an event, the user need not prepare a program for controlling the pool, and the object pool can also be controlled at the point of time when there is no user object, such as the time of starting up an application. Further, in this case, the event issued between the server and the object pool can be easily notified through a network by using ORB (Object Request Broker) corresponding to the distributed environment such as the event service of CORBA (Common ORB Architecture). By defining an event in an open standard form such as CORBA, interconnectivity can be expected between different vendors.

As described above, in accordance with the present invention, the response time can be shortened when an object creation is requested from a client for the first time after the start-up of the server. Further, keeping track of the status of an application, the usability of the object pool can be increased.

What is claimed:

1. An object pool data processing system using distributed objects, comprising:

a computer comprising memory and at least one processor;

an application server executing in the memory by the processor of the computer and hosting an application;

an object pool established in the memory by the application server, the object pool comprising a multiplicity of object proxies to objects of the application;

a client request analyzing unit disposed in the object pool and executing in the memory by the processor for analyzing an access request by a client to an object amongst the objects of the application;

an object information storage unit executing in the memory by the processor for storing object information at a termination of a process of said object pool;

an object creating unit disposed in the object pool executing in the memory by a processor for creating an object at a starting of a process of said object pool according to said object information stored by said object information storage unit; and an object managing unit disposed in the object pool and executing in the memory by a processor for pooling the object in the object pool created by said object creating unit before accessing said object from said client;

said application server notifying said object managing unit of an event according to a change in status of said application, and said object managing unit automatically updating said object management information according to the notification of said event from said application server.

2. The object pool data processing system as set forth in claim 1, wherein the object information stored by said object information storage unit is constructed so that it can be at least recognized to be a last accessed object, and said object creating unit starting creation of said object from said last accessed object.

* * * * *